March 17, 1970     L. E. ELLISON     3,501,742
DECELERATION SIGNALLING SYSTEM FOR MOTOR VEHICLES.
Filed Aug. 11, 1966     2 Sheets-Sheet 2
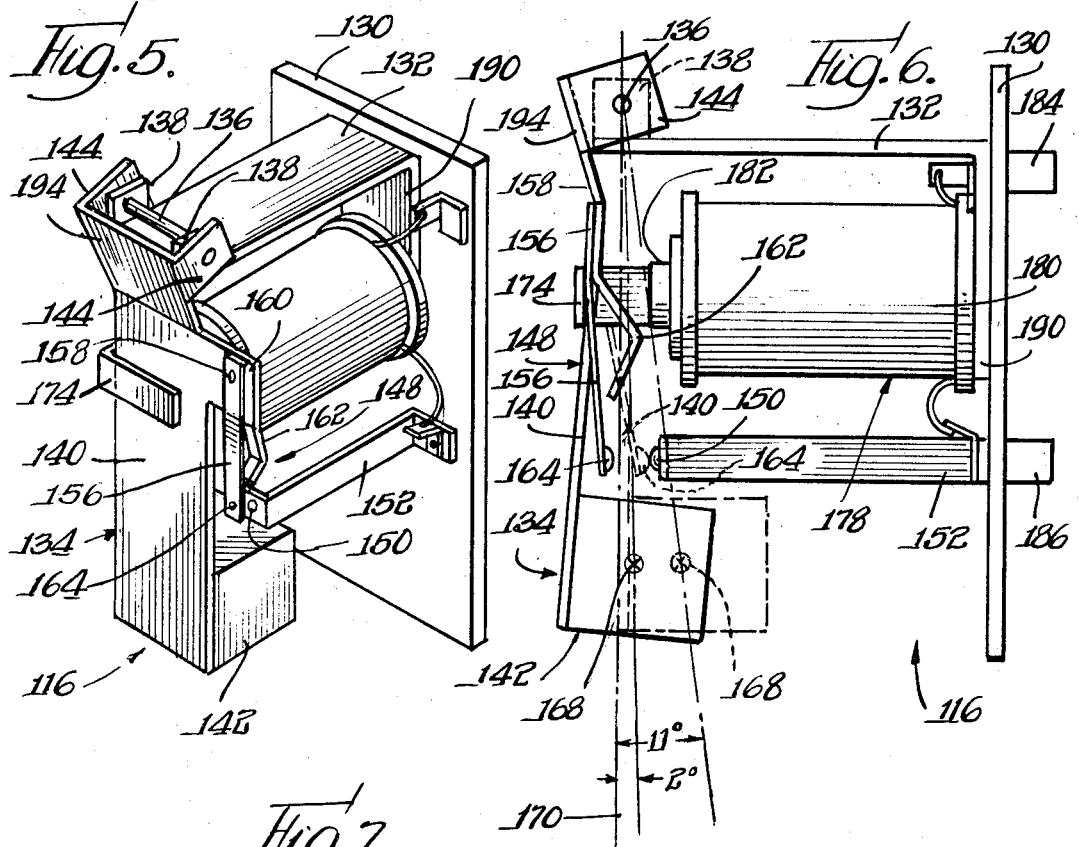
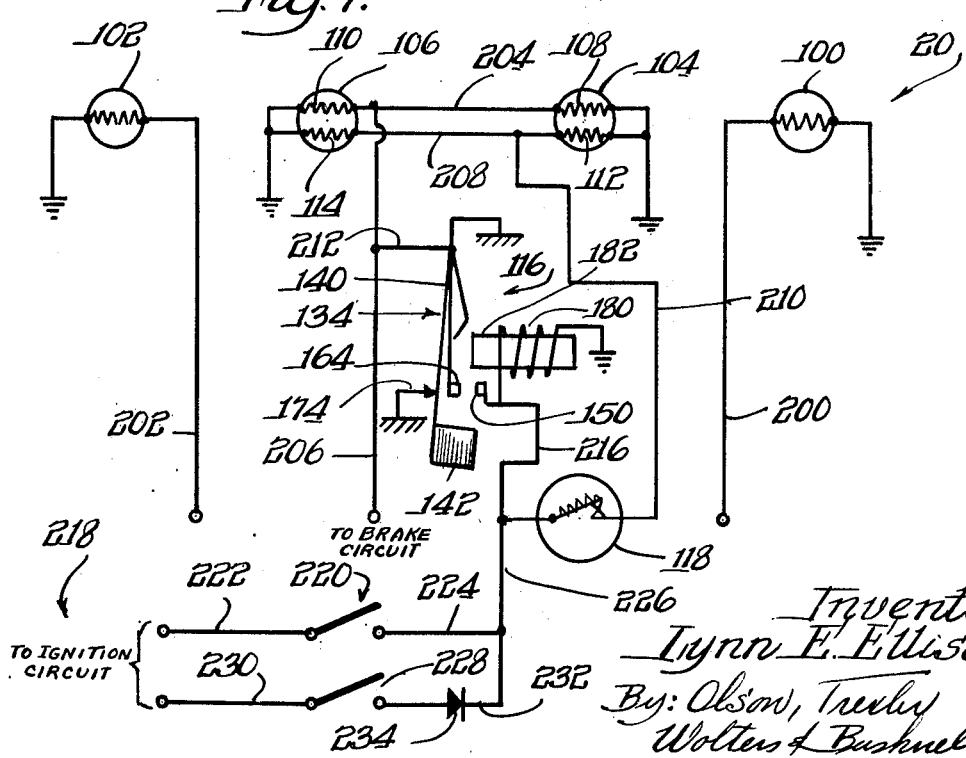
Inventor
Lynn E. Ellison
By: Olson, Trexler
Wolters & Bushnell attys United States Patent Office 3,501,742
Patented Mar. 17, 1970

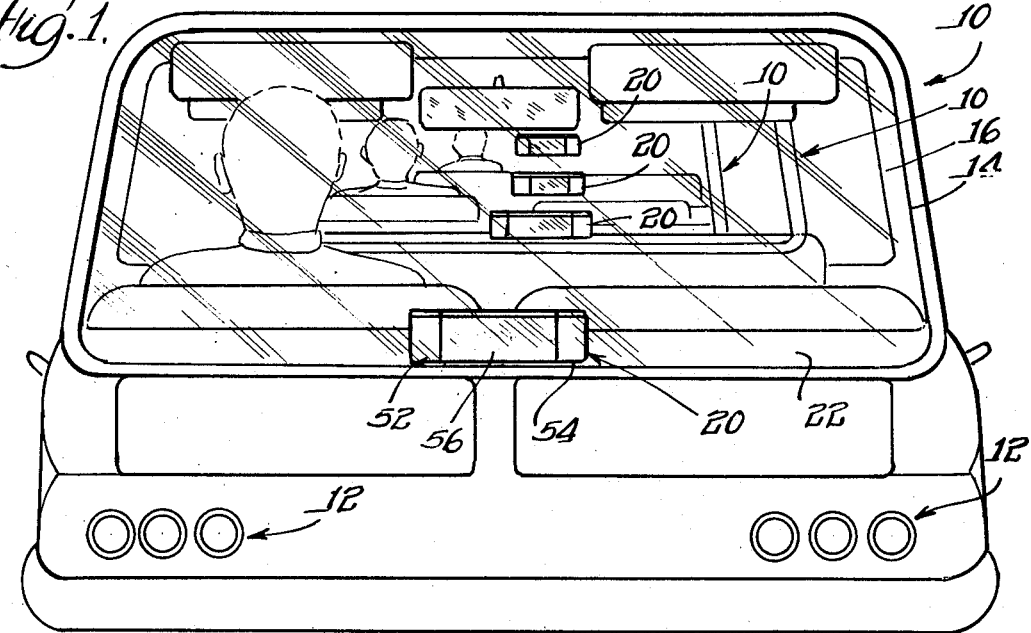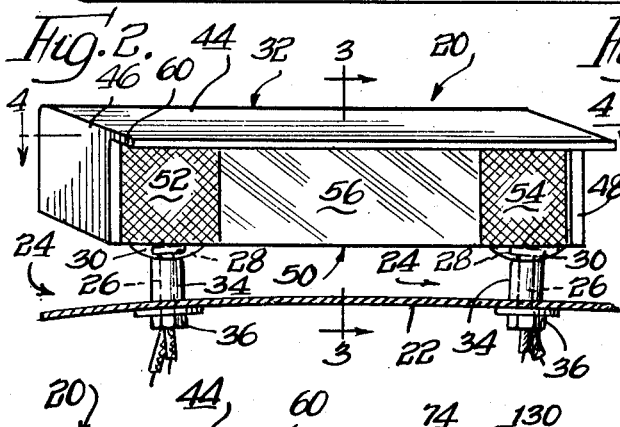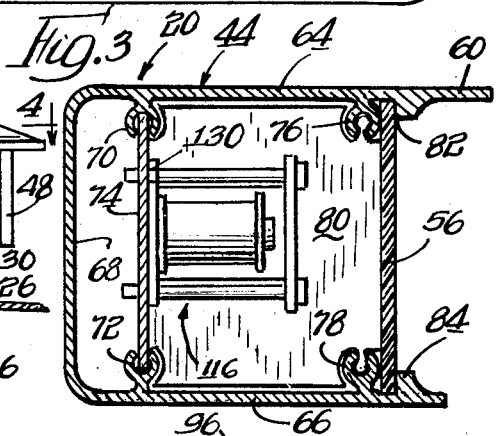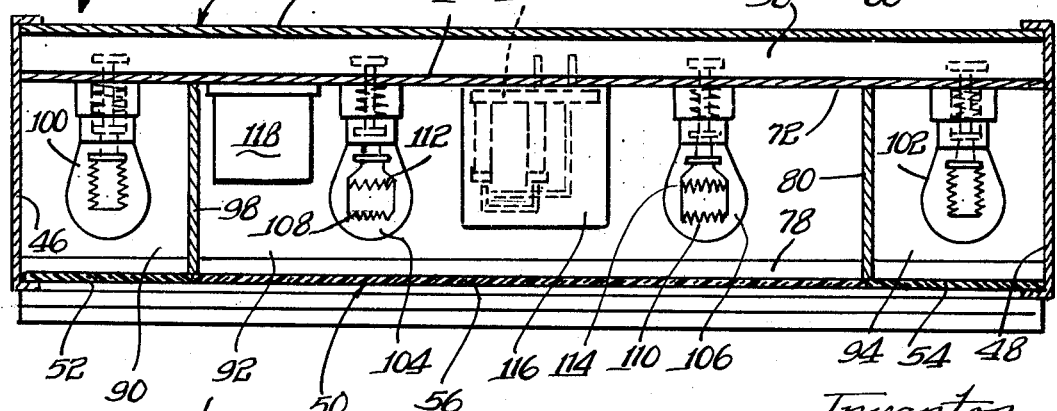

3,501,742
DECELERATION SIGNALLING SYSTEM
FOR MOTOR VEHICLES
Lynn E. Ellison, 44 Industrial Road,
Crystal Lake, Ill. 60014
Filed Aug. 11, 1966, Ser. No. 571,856
Int. Cl. B60q 1/26; G08b 21/00; H01h 35/02
U.S. Cl. 340—71                               11 Claims

ABSTRACT OF THE DISCLOSURE

A deceleration signalling system for a motor vehicle, which system includes a source of light, an inertia switch assembly, main circuit means interconnecting said source of light with said inertia switch assembly and the brake light circuit of said vehicle. The inertia switch assembly includes a pair of normally open contacts disposed in circuit with the source of light, and means for closing said contacts upon the deceleration of said vehicle at a predetermined rate. In addition, said inertia switch assembly comprises electromagnetic means energized by the brake circuit for maintaining said contacts in engagement after the deceleration of said vehicle falls below said predetermined rate, but permitting said contacts to separate once the brake circuit is deenergized. Further, said system employs a novel signal unit construction for mounting on a vehicle to warn following vehicles of rapid deceleration, said unit being designed and constructed to house the above-mentioned signalling system.

This invention relates generally to an automotive signal system and more particularly to an automatic signal system for warning following vehicles of unexpected changes in motion of a vehicle.

Large numbers of automobiles commonly follow closely behind each other at high rates of speed on today's modern highways and expressways. If one of the automobiles decelerates, stops or backs up in an unexpected manner, the following cars often collide in a series of rear-end chain collisions. These chain collisions result from the failure of drivers of the following cars to anticipate the deceleration, stopping or backing up of an automobile several cars ahead in the line. By the time a car immediately ahead of a following automobile begins to decelerate, the driver of a following car has insufficient time in which to react and stop his vehicle. The result is a series of rear-end collisions of a large number of cars involving extensive personal injuries and property damage.

The most common prior art solution to this problem is the use of brake lights on the rear of automobiles. The brake lights warn a following driver that the car immediately ahead is slowing down or stopping. However, the brake lights on cars further ahead are obscured by the car immediately ahead and do not give a following driver warning of an impending slowdown or stoppage of the line of cars. Also, the brake lights are energized by even the slightest pressure on a brake pedal. This results in an over-signalling which lessens the effectiveness of the brake lights as a warning of rapid deceleration. The effectiveness of the common brake light is still further reduced because the light varies greatly in location on the vehicle, in size and is often used as a tail light as well as a brake light.

In addition to the common brake light, there are many prior art devices for indicating vehicle turns, vacuum conditions at a carburetor, position of brake and accelerator pedals. These signal systems all include complex switching systems which over-signal and provide many meaningless and unimportant signals. The numerous and varied signals reduce the effectiveness and reliability of the signalling system, since they are confusing and tend to be ignored. In addition, the prior art signalling systems lack the necessary versatility to warn of a vehicle's deceleration and to provide selectively actuatable signal for indicating that a vehicle is stopped or backing up.

Therefore, it is an object of this invention to provide an improved signalling system which is readily visible for warning cars several positions behind a vehicle that the vehicle s decelerating at a relatively high rate, is stopped, or is backing up.

Another object of this invention is to provide a simple, easily understood signalling system which is actuated by deceleration in excess of a predetermined rate to warn following vehicles of the rapid deceleration to give drivers of the following vehicles sufficient time in which to stop.

Another object of this invention is to provide a signalling system using a rugged, economical inertia switch for indicating deceleration in excess of a given rate without false signalling caused by switching due to curves or rough roads.

Another object of this invention is to provide an automatic warning signal which is actuated by only high rates of deceleration tending to cause accidents and in unaffected by normal or routine levels of deceleration, signalling of which would tend to cause disregard of the signal by following drivers.

Another object of this invention is to provide a signalling system for use by a vehicle operator when stopped along a highway and when entering heavy or high speed traffic.

Another object of this invention is to provide an automatic warning signal to indicate when a vehicle is backing up.

These and other objects and features of the invention will become more apparent upon a reading of the following detailed description, taken in connection with the accompanying drawings, wherein:

FIG. 1 is a view, as seen from a following vehicle, of a series of vehicles in a line of traffic with a signal unit, forming a preferred embodiment of the invention, mounted in the rear of the vehicles ahead of the following vehicle;

FIG. 2 is an enlarged view of the signalling unit of FIG. 1;

FIG. 3 is an enlarged view, taken along the line 3—3 of FIG. 2, illustrating the relationship of a component mounting partition and lens assembly to a housing for the signal unit;

FIG. 4 is an enlarged view, taken along the line 4—4 of FIG. 2, further illustrating the relationship of the component mounting partition, the lens assembly and the components of the signal unit;

FIG. 5 is an enlarged perspective view of a pendulum type inertia switch used in the signal unit of FIG. 2;

FIG. 6 is an enlarged elevational view of the switch of FIG. 5; and

FIG. 7 is a schematic drawing illustrating a control circuit used with the signal unit of FIG. 2.

Referring now to the drawings in greater detail, there is shown in FIG. 1 a view of a line or chain of preceding vehicles 10 as seen by the driver of a following vehicle in the line. It should be noted that the brake and tail lights 12 of only the immediately preceding vehicle 10 are visible to the driver of the following vehicle. Brake lights on the vehicles ahead of the immediately preceding vehicle are obscured by the bulk of the immediately preceding vehicle and are not visible to the driver of a following vehicle. However, the driver of a following vehicle can look through rear windows 14 and windshields 16 of several preceding vehicles in the chain and see a signal unit 20 mounted on a rear window shelf 22 of the preceding vehicle 10. Since the signal units 20 of the preceding vehicles are positioned in the direct line of vision of a following driver and are mounted in the transparent window area of the vehicles, the signal unit for a vehicle several positions ahead of a following driver is clearly visible.

Referring now to FIG. 2, the signal unit 20 is mounted on the rear shelf 22 of a vehicle by a pair of mounting assemblies 24. The mounting assemblies 24 include a threaded conduit or tube 26 which is mounted with a threaded nut or head portion 28 in downwardly protruding arcuate recess or dish 30. The dish 30 is integrally formed with a generally rectangular housing or casing 32. A spacer 34 is mounted intermediate the dish 30 and shelf 22 to position the housing 32 a predetermined distance above the shelf 22. A suitable nut and washer combination 36 is connected to the conduit 26 beneath the shelf to securely connect the signal unit 20 to the shelf. The arcuate dish 30 permits the conduit 26 to be angled relative to a vertical axis of the signal unit 20 to facilitate mounting the housing 32 on shelves of different arcuate curvatures. The mounting assembly 24 is adapted for use with either concave or convexly curved shelves 22, since the conduit 26 can be pivoted outwardly or inwardly relative to the casing 32.

The casing 32 includes a generally U-shaped channel or body member 44 which is closed at opposite ends by a pair of caps or end walls 46 and 48. A plurality of lenses 50 are mounted at the mouth of the generally U-shaped channel or body 44. The lenses 50 include an amber lens 52 for signalling left turns of a vehicle, an amber lens 54 for signalling right turns of a vehicle, and a red central lens 56 for signalling braking or deceleration of a vehicle. The lenses 52, 54 and 56 are shaded by an outwardly extending visor section 60 (see FIGS. 2 and 3) of the generally U-shaped body or channel 44.

As is best seen in FIG. 3, the generally U-shaped body or channel 44 includes a longitudinally extending upper side wall 64 which is located in a spaced-apart generally parallel relationship with a longitudinally extending base or side wall 66 of the body member 44. The side walls 64 and 66 are interconnected by a rear wall 68 which extends generally perpendicularly to the two side walls. A first set of longitudinally extending mounting slots 70 and 72 are integrally formed with the side walls 64 and 66 for supporting a mounting panel or partition 74 on which components of the signal unit 20 are mounted. A second set of longitudinally extending mounting slots 76 and 78 are integrally formed with the side walls 64 and 66 in a spaced-apart substantially parallel relationship with the mounting slots 70 and 72 for retaining a transversely extending panel or partition 80. A pair of longitudinally extending lens mounting slots 82 and 84 are integrally formed with the side walls 64 and 66 for mounting the lenses 52, 54, 56 in the generally U-shaped body 44. The generally U-shaped body member 44 and the mounting slots are advantageously formed of an integral aluminum extrusion.

The longitudinally extending mounting partition 74 with electrical components mounted and wired thereon, and the transversely extending partition 80 are mounted in the body 44 by sliding them longitudinally relative to the body in the slots 70, 72, 76 and 78. Once the mounting partition 74 is positioned in the body 44, the lenses 52, 54 and 56 are slid longitudinally into the slots 82 and 84 to mount them in the body 44. After the partition 74 and lenses 50 have been positioned in the body 44, the end walls 46 and 48 are slid over opposite ends of the body 44 to provide an enclosed casing for the components of the signal unit which are mounted on the partition 74.

As is best seen in FIG. 4, the generally U-shaped body 44 is divided into a plurality of sections or compartments 90, 92, 94 and 96 by the longitudinal mounting partition 74, the transverse partition 80, and a second transverse partition 98 which extends parallel to the first transverse partition 80 in an abutting relationship with the lenses 52 and 56. A light source or bulb 100 is mounted on the partition 74 in the compartment 90 to indicate when a vehicle is going to make a left-hand turn by radiating light rays through the amber colored lens 52. Similarly, a light source or bulb 102 is mounted in the compartment 94 to indicate when a vehicle is going to make a right-hand turn by radiating light rays through the amber colored lens 54. A pair of dual filament bulbs or light sources 104 and 106 are mounted in a spaced-apart relationship on the partition 74 in the compartment or section 92. The dual filament bulbs 104 and 106 indicate when a brake system for a vehicle is being energized and when the vehicle is decelerating in excess of a predetermined rate. The bulbs 104 and 106 signal the energization of the vehicle braking system by emitting a relatively weak light of approximately 6 candle power from filaments 108 and 110.

As will be explained in greater detail subsequently, the bulbs 104 and 106 indicate a deceleration of a vehicle in excess of a predetermined rate of deceleration by emitting bright flashing light of approximately 60 candle power from the filaments 112 and 114. An addition, an inertia switch 116 and a flasher unit 118 are mounted on the panel 74 in the compartment 92. A relatively narrow longitudinally extending wiring compartment 96 is provided between the rear of the panel 74 and the rear wall 60 of the generally U-shaped body 44. The light sources 100 and 102, 104 and 106, the flasher 118 and the inertia switch 116 are interconnected by wiring, connected in accordance with the schematic diagram of FIG. 7, which has been omitted for purposes of clarity from FIG. 4. It will be understood, of course, that the components which are mounted on the partition 74 have terminals which extend through the partition to facilitate interconnecting the components which are wired before the partition is slid into the housing 32.

In view of the foregoing remarks, it will be apparent that the signal unit 20 is a compact readily assembled structure. The assembly of the unit is facilitated by the utilization of a generally U-shaped body 44 having integrally formed mounting slots for retaining the longitudinally extending component mounting partition 74, a pair of transverse partitions 98 and 80, and the lenses 50 securely in the unit. The mounting partition 74, with the light sources, inertia switch and flasher unit mounted and wired thereon, is moved longitudinally into the body member 44 in sliding engagement with the mounting slots 70 and 72. The lenses 52, 54 and 56 are then slid into the mounting slots 82 and 84 in front of the associated light sources. Once the mounting partition 74 and lenses have been positioned in the body 44, the caps or end wall 46 and 48 are pressed into frictional engagement with the end of the generally U-shaped body 44 to seal the signal unit 20. The signal unit is then ready for mounting, on the assemblies 24, in the rear of a vehicle with the lenses 52, 54 and 56 facing rearwardly, as indicated in FIG. 1, relative to the vehicle.

The inertia switch 116 is shown in greater detail in FIGS. 5 and 6. The inertia switch includes a base plate 130 which is mounted against the longitudinally extending partition 74 (see FIGS. 3 and 4) to position the inertia switch with a mounting frame 132 extending outwardly from the base plate 130. The mounting frame 132 extends rearwardly relative to a vehicle in which the signal unit 20 is mounted. A pendulum assembly 134 is pivotably mounted by a pin 136 on upstanding flanges 138 which are formed integrally with opposite sides of the frame 132. The pendulum assembly 134 includes an armature plate or frame 140 on which a mass or weight 142 is secured. The pendulum assembly 134 is connected to the pivot pin 136 by means of a pair of spaced apart inwardly extending ears or tabs 144 which engage outer surfaces of the upstanding flanges 138.

A movable reed type contact assembly 148 is mounted on the armature plate 140 for pivotal movement relative to a fixed contact assembly 150 mounted on a post 152 supported by the base plate 130. The movable contact assembly 148 includes a reed or lever 156 which is connected by a suitable fastener, such as a rivet 158, to an outwardly projecting arm 160 of the armature plate 140. An adjusting lever or tang 162 is integrally formed with the arm 160 for biasing the spring lever or reed 156 relative to the armature plate 140. The adjusting tang 162, can be bent to vary the spacing between the fixed contact 150 and an electrical contact 164 on the spring lever 156.

As is perhaps best seen in FIG. 6, the pivot pin 136 is mounted in substantial alignment with the armature plate 140 to cause the pendulum assembly 134 to tend to swing to the left, as seen in FIG. 6. This leftward movement results from a center of gravity 168 of the pendulum assembly 134 tending to pivot the pendulum assembly around the pivot pin 136 to align the center of gravity 168 with a vertical axis or center line 170 extending through the pivot pin 136. When the pendulum assembly 134 is in its normal unrestrained position, the vertical axis 170 forms a center line for the pendulum assembly and extends through the center of gravity 168 and the pivot pin 138. However, the center of gravity 168 of the pendulum assembly 134 is biased an arcuate distance of two degrees to the right of the center line 170 by a generally U-shaped stop member or lever arm 174. Therefore, when the inertia switch 116 is in the normal or unactuated position shown in FIGS. 5 and 6, the armature plate 140 of the pendulum assembly 134 presses outwardly against the stop arm 174 which retains the center of gravity 168 of the pendulum assembly an arcuate distance of two degrees inwardly toward the base plate 130 from its normal position coincident with the center line 170 of the pendulum assembly.

When a vehicle in which the signal unit 20 is installed decelerates at a relatively high rate, the pendulum assembly 134 swings around the pivot pin 136 forwardly toward the front of the car, or inwardly toward the base plate 130, due to inertia forces acting on the mass or weight 142. This pivoting movement results in the contact 164 making an elcetrical connection with the fixed contact 150, as illustrated in dashed lines in FIG. 6. The arcuate distance through which the pendulum assembly 134 pivots in order to make an electrical connection between the fixed contact 150 and the movable contact 164 is approximately nine degrees. However, due to the two degree bias applied to the pendulum assembly 134, the inertia forces to which the pendulum assembly must be subjected to move the pendulum assembly inwardly to engage two contacts 150 and 164 is equal to the inertia forces required to pivot the pendulum assembly through an arcuate distance of eleven degrees or 1.12 g's of deceleration. The initial two degree bias on the pendulum assembly 134 by the stop arm 174 prevents the pendulum assembly from oscillating due to rough roads and making false or spurious engagement between the fixed contact 150 and movable contact 164. When the two contacts 150 and 164 are in engagement the light sources 104 and 106 for indicating deceleration of the vehicle are energized. Of course, the pendulum type inertia switch 116 can be adjusted, by a suitable positioning of the contacts 150 and 164, and the stop arm 174, to be actuated by any desired rate of deceleration.

The magnetic assembly 178 includes a coil 180 and a core piece 182. The stop arm 174 is mounted on the coil 180 at an outermost end of the core piece 182. The coil 180 is connected to wiring terminals 184 and 186 which are wired to a main control circuit for the signal unit. When energized, the outwardly extending magnetic assembly 178 retains the armature plate 140 in an inward position, indicated by dashed lines in FIG. 6, to maintain the fixed contact 150 and movable contact 164 in engagement. Since the frame piece 132 is made of a soft iron and includes a leg section 190 extending between the base plate 130 and the coil 180, the frame 130 provides a magnetic path for flux originating from the coil 180. Thus, when the coil 180 is energized, flux flows from the coil through the leg 190 of the frame member 132, the flanges 138, ears 144 to the plate 140 and the core piece 182. The flow of flux is facilitated by the angular head section 194 of the armature plate 140 which contacts the outwardly extending frame 132 when the pendulum assembly 134 is pivoted inwardly due to a deceleration of a vehicle in excess of 1.12 g's or an energization of the coil 180.

A schematic drawing is set forth in FIG. 7 illustrating a main control circuit for the signal unit 20. The main control circuit includes the turn signal lights 100 and 102 for indicating the direction in which a vehicle is going to turn. The turn signal lights 100 and 102 are connected to a front turn signal light circuit for the vehicle by leads 200 and 202, so that the turn signal lights are not energized by an actuation of a braking system for the vehicle. The double filamented light sources 104 and 106 have filaments 108 and 110 for indicating a braking of the vehicle and the filaments 112 and 114 for signalling a deceleration of the vehicle. As previously explained, about ten times as much light is emitted from the filaments 112 and 114 to signal a deceleration of a vehicle as is emitted from the filaments 108 and 110 to signal a braking of the vehicle. The filaments 108 and 110 are interconnected in series by a lead 204 which is connected to the brake circuit for the vehicle by a lead 206. The two filaments 112 and 114 for signalling a deceleration of the vehicle are interconnected by a lead 208 which is connected to the interrupter or flasher unit 118 by a lead 210.

The inertia switch assembly 116 is connected to the brake circuit for the vehicle through a lead 212 which is connected to the movable contact 164 by the armature plate 140. When the deceleration of the vehicle is in excess of 1.12 g's, the pendulum assembly 134 is swung away from the stop 174 to make an electrical connection between the movable contact 164 and fixed contact 150. If this deceleration is due to an application of the braking system for the vehicle, current flows from the energized brake circuit through the leads 206 and 212 through the contacts 164 and 150 to energize the coil 180 which locks the contacts 150 and 164 in engagement. In addition, current flows through the lead 206 from the brake circuit and the contacts 164 and 150 to a lead 216 which is connected to the flasher unit 118. The flasher unit 118 is normally closed so that current initially flows through the flasher unit and the lead 210 to energize the filaments 112 and 114 of the deceleration signal lights 104 and 106. As current flows through the flasher unit 118, the flasher is heated up to interrupt the circuit at a rate of 90 to 120 c.p.s. Thus, the filaments 112 and 114 emit a bright flashing signal which is clearly visible, even through the rear windows and windshields of several preceding cars, to warn a driver of a following car of the relatively rapid deceleration of a preceding vehicle.

While the brake circuit for the vehicle is energized, the coil 180 is energized to retain the fixed contact 150 in engagement with the movable contact 164 of the pendulum assembly 134. If the initial deceleration of the vehicle exceeds 1.12 g's, the signal lights 104 and 106 are energized and the contact 164 locked in engagement with the contact 150 by the coil 180. If the rate of deceleration falls below 1.12 g's, the signal lights 104 and 106 are maintained in an energized state by the holding action of the coil 180 until the brake circuit for the vehicle is deenergized. However, if the initial deceleration of the vehicle does not exceed 1.12 g's, that is, the vehicle merely decelerates at a relatively slow rate, the filaments 112 and 114 are not energized to emit a bright flashing signal. However, the low intensity filaments 108 and 112 are energized by the slow deceleration, through the leads 206 and 204 from the brake circuit, to warn following drivers that the brakes of the vehicle have been applied. Therefore, the signal unit avoids unnecessary signalling by emitting a bright flashing signal only when a vehicle is decelerating at a relatively high dangerous rate.

In addition to the aforementioned main signalling circuit, auxiliary circuitry 218 is included with the signal unit 20. The auxiliary circuitry 218 includes a manually actuated dashboard-mounted emergency switch 220 which is connected to an ignition circuit for the vehicle by a lead 222. The selectively actuatable manual switch 220 is also connected by the leads 224 and 226 to the flasher unit 118, which is in turn connected by the leads 210 and 208 to the filaments 112 and 114 of the signal lights 104 and 106. Therefore, when the ignition circuit for the vehicle is energized and the switch 220 is closed, the signal lights 104 and 106 are energized to emit a bright flashing signal to warn approaching drivers of the vehicle. It is anticipated that the manually actuatable switch 220 will be closed to emit a signal when the vehicle is pulled off to the side of the road, due to mechanical failure or other reasons, and when the vehicle is entering relatively fast moving traffic from a side entrance. Of course, there are many other emergency situations in which the manually actuatable switch 220 can advantageously be closed to emit a bright flashing signal from the lights 104 and 106.

In addition to the manually actuatable switch 220, a reverse gear switch 228 is provided in the auxiliary circuit 218. The reverse gear switch 228 is closed when the gear selector for the vehicle is shifted into a reverse position. The switch 228 is connected to an ignition circuit for the vehicle by a lead 230 and is connected to the flasher 118 and signal lights 104 and 106 by the leads 226 and 232. A diode 234 is connected to the switch 228 to prevent current from flowing through the lead 206 from the vehicle brake circuit, the lead 212, the contacts 164 and 150, and the leads 216 and 226 to the ignition circuit when the brakes for the vehicle are applied while the gear selector is in a reverse gear position to close the switch 228.

The manually actuatable switch 220 and reverse gear switch 228 are both connected to the coil 180 by the lead 216. Therefore, when either the switch 220 or 228 is closed, the coil 180 is energized to magnetize the core piece 182. The magnetized core piece 182 normally tends to attract the plate 140 of the pendulum assembly 134 to pivot the pendulum assembly 134 inwardly to the position indicated in dashed lines in FIG. 6. However, the pendulum assembly is initially in engagement with the stop arm 174 which is mounted on the outermost end of the core piece 182. Therefore, the stop arm 174 is magnetized and attracts the plate 140 to retain the pendulum assembly in the position indicated in solid lines in FIG. 6. The stop arm 174 effectively short circuits the magnetism of the core piece 182 to prevent the core piece from attracting the plate 140 and swinging the pendulum inwardly to close the contact 150. Since the contacts 150, 164 are not closed when the manual switch 220 or the reverse gear switch 228 is operated, current cannot be conducted from the ignition circuit through the lead 226 and 216, the contacts 150 and 164, and the leads 212 and 206 to the brake circuit for the vehicle. Therefore, the brake lights are not energized when either the manual switch 220 or reverse gear switch 228 is operated.

It should be noted that the stop arm 174, which is formed of a soft iron, does not prevent the pendulum assembly 134 from being attracted by the core piece 182 when the vehicle decelerates at a rate in excess of 1.12 g's. This is because the core piece 182 is not normally magnetized until the contacts 150 and 164 are closed, due to the inward movement of the pendulum assembly 134. Since the core piece 182 is not magnetized until after the plate 154 has moved out of engagement with the stop arm 174, the stop arm 174 does not effectively short circuit the magnetic field from the core piece 182 to prevent the pendulum assembly 134 from swinging inwardly during the normal operation of the inertia switch 116. In view of the preceding remarks, it will be apparent that the stop arm 174 retains the pendulum assembly in a spaced apart relationship relative to the core piece 182 when the coil 180 is energized before the pendulum assembly swings inwardly out of engagement with the stop arm 174. The switch contacts 150 and 164 remain open and current is prevented from flowing from the auxiliary circuitry 218 to the brake circuit for the vehicle to give a false braking signal. Of course, the stop arm 174 could be replaced with a stop arm of brass or other nonmagnetizable material rather than a soft iron. However, if this was done, a diode would have to be placed in the main circuit lead 212 to prevent current from flowing through the contacts 150 and 164 to the lead 206 to the brake circuit for the vehicle. The diode would also be necessary to prevent the filaments 108 and 110 of the signal lights 104 and 106 from being energized.

The operation of the signal unit 20 will be apparent from the foregoing description. Howveer, for purposes of affording a more complete understanding of the invention, a functional description is now provided of the mode in which the component parts cooperate. The signal unit 20 is mounted in the rear of a vehicle with a plurality of signal lights 100, 102, 104 and 106 for warning following drivers of changes in motion of the vehicle. The signal lights 100 and 102 will warn the following driver that the vehicle is going to turn. The signal lights 104 and 106 will warn following drivers, with a low intensity signal from the filaments 108 and 110, that the brakes for the vehicle have ben applied. If the vehicle should decelerate at a rate in excess of 1.12 g's, the inertia switch 116 will be closed to energize the filaments 112 and 114 of the signal lights 104 and 106 to emit a bright flashing signal to warn following drivers of the comparatively abrupt change in motion of the vehicle. Of course, individuals skilled in the art can adjust the switch 116 to signal any desired rate of deceleration other than the exemplary value of 1.12 g's.

It should be noted that the signal unit 20 emits only three easily understood signals which indicate the basic changes in motion of the vehicle which need to be called to the attention of the following drivers. Thus, a turning of the vehicle is indicated by a signal through the amber lenses 52 and 54 from the light sources 100 and 102. A braking signal indicated by a low intensity light is emitted from the filaments 108 and 110 of the light sources 106 and 104 through the red lens 56. In addition to these two easily understood signals, a bright flashing signal is emitted from the filaments 112 and 114 of the light sources 104 and 106 when the deceelration of the vehicle exceeds a predetermined amount (i.e., 1.12 g's.) to actuate the inertia switch 116.

The relatively simple, rugged inertia switch 116 will not emit spurious, confusing signals due to rough roads or curves because the pendulum assembly 134 is retained in a two degree biased position pressing against the stop member 174 until the vehicle starts to decelerate at a relatively high rate. Once a vehicle has started to decelerate at a rate in excess of 1.12 g's., the coil 180 is retained in an energized state as long as the brake circuit for the vehicle is energized. The energized coil 180 locks the contacts 150 and 164 closed to provide a continuous flashing signal from the light sources 104 and 106. Of course, when the brakes for the vehicle are released, the brake circuit is deenergized and the coil 180 is deenergized to enable the pendulum assembly 134 to swing to its normal biased position against the stop member 174.

The signal unit 20 is also activated to emit signals by a closing of the auxiliary switches 220 and 228. The switch 220 is mounted on the dashboard of the vehicle for selective manual actuation to warn following drivers, or drivers approaching a stopped vehicle from the rear, of an emergency condition. The switch 228 is closed by shifting the gear selector to the reverse position to warn oncoming drivers that the vehicle is backing up.

The assembly of the signal unit 20 is facilitated by the housing or casing structure 32 which includes a generally U-shaped body member 44 into which a mounting panel or partition 74 is slid with the electrical components of the signal unit mounted and wired on the panel. In addition, the insertion of the lenses 52, 54 and 56 is facilitated by the mounting slots 82 and 84 which are formed integrally with the body member 44. Once the mounting partition 74, and the electrical components of the signal unit 20 have been inserted into the casing 32 and the lenses 50 installed, the ends of the body member 44 are closed by pressing the cap or end walls 46 and 48 into place. The relatively long, narrow signal unit is readily mounted on the rear window shelf of most vehicles, where it is clearly visible to following drivers, by means of the mounting assemblies 24.

When a vehicle, in which the signal unit 20 is mounted, is being driven down a turnpike or expressway in heavy traffic, the signal unit 20 will be visible to the driver of a vehicle several vehicles behind. The driver of this following vehicle can look through the clear windows of the preceding cars and see the signal unit 20, which is mounted where it is clearly visible, through the windshields of a number of vehicles. The driver of this vehicle will, therefore, be alerted to the impending deceleration of the vehicles immediately ahead in time to safely stop his own vehicle. It is the margin of time which the signal unit provides this driver that will prevent the many chain collisions which commonly occur on expressways.

It is anticipated that the signal unit 20 will find widespread usage on many types of vehicles and conveyances. For example, the signal unit can advantageously be mounted on trailers which obscure the signal lights of a towing vehicle. The signal unit can also be used on motor bikes, camper-trailers, trucks, boats and any similar moving structure, to signal a deceleration of the structure. In view of the preceding remarks, it will be apparent that the signal unit 20 can be used with a wide range of moving structures. Therefore the word vehicle, as used in the claims and specification, is intended to include any means of carrying or transporting something.

It is also contemplated that the inertia switch 116 can be used in an acceleration signaling unit by merely reversing the orientation of the switch relative to the vehicle, that is by placing the switch so that the frame 132 projects forwardly rather than rearwardly relative to the vehicle. It will be apparent to those skilled in the art that the inertia switch 116 can be made from components other than those illustrated, such as solid state devices of known construction. In view of the many possible changes in structure and uses for the signal unit 20, the specific embodiment herein shown and described is to be considered as being primarily illustrative. Various changes in structure beyond those described will, no doubt, occur to those skilled in the art; and these changes are contemplated.

What is claimed is:

1. A deceleration signalling system for a vehicle, including: a source of light, an inertia switch assembly; main circuit means interconnecting said source of light, said inertia switch assembly, and a brake circuit for the vehicle; said inertia switch assembly including, a base, a pendulum mounted for pivotal movement relative to said base, a pair of normally spaced-apart contacts in circuit with said source of light, one said contact being carried by said pendulum and the other by said base, such that a predetermined rate of deceleration will cause said pendulum to pivot from a first position to a second position wherein said contacts are engaged to energize said source of light, and electromagnetic means in circuit with said brake circuit and carried by said base, said electromagnetic means being energized by brake circuit for attracting and maintaining said pendulum in said second position thereby to provide a signal from said light source for following vehicles during the time said brake circuit is energized, said pendulum being released by said electromagnetic means upon the deenergization of said brake circuit to allow said pendulum to move from said second position to said first position thereby to terminate the signal being admitted by said source of light.

2. A deceleration signalling system as defined in claim 1, further including stop means against which said pendulum is engaged when in said first position, said stop means being magnetized by said electromatic means to attract said pendulum and thereby permit the closing of said contacts only upon the energization of said brake circuit in conjunction with rapid deceleration.

3. A signalling system as set forth in claim 1 further including: auxiliary circuit means connected to said main circuit means, said auxiliary circuit means including manually actuatable switch means for selectively energizing said source of light to provide a warning signal when the brake circuit is deenergized.

4. A signalling system as set forth in claim 1 further including: auxiliary circuit means connected to said main circuit means, said auxiliary circuit means including reverse switch means actuated by switching the vehicle into reverse gear for energizing said source of light to provide a warning signal when the brake circuit is deenergized.

5. A signalling system as set forth in claim 1 wherein: said main circuit means includes interrupter means for periodically deenergizing said source of light when said inertia switch means is in said second position and the brake circuit is energized to provide a flashing signal to the following vehicles.

6. A deceleration signalling system for a vehicle including: inertia switch means supported by the vehicle, said inertia switch means including a base means, a frame means connected to and extending outwardly from said base means, pendulum means connected to said frame means for pivotal movement toward said base means from a first position to a second position when the deceleration of the vehicle exceeds a predetermined rate of deceleration, biasing means supported by said base means to hold said pendulum means in said first position with a central axis of said pendulum means offset a predetermined angular distance toward said base means relative to a vertical axis to prevent movement of said pendulum means relative to said base means by changes in motion of said vehicle which are less than said predetermined rate of deceleration, first contact means attached to said base means, second contact means attached to said pendulum means, said first contact means being spaced-apart from said second contact means when said pendulum means is in said first position, and said first contact means being in engagement with said second contact means when said pendulum means is in said second position, and magnetic means supported by said base means for retaining said pendulum means in said second position while a brake circuit for the vehicle is energized; a source of light to signal a rate of deceleration of the vehicle in excess of said predetermined rate of deceleration; and circuit means connected to said first contact means and said source of light, said circuit means being energized by movement of said pendulum means from said first position to said second position to energize said source of light.

7. A signal unit for mounting on a vehicle to warn following vehicles comprising: a body means having first and second spaced-apart substantially parallel longitudinally extending side walls interconnected by a rear wall, and first and second end walls extending intermediate said first and second side walls and said rear wall at opposite ends of said body means; longitudinally extending lens means supported by said first and second side walls adjacent to a forward portion of said body means, said lens means extending intermediate said first and second side walls and said first and second end walls; longitudinal partition means supported by said first and second side walls adjacent to said rear wall, said partition means being positioned intermediate said lens means and said rear wall in a substantially parallel relationship with said rear wall and said lens means, first and second substantially parallel transverse partition means connected to said longitudinal partition means, said first and second transverse partition means being positioned intermediate said first and second side walls to divide said body means into a plurality of sections; a first source of light mounted on said longitudinal partition means intermediate said first end wall and said first transverse partition means for signalling that the vehicle is going to turn in a first direction; a second source of light mounted on said longitudinal partition means intermediate said second end wall and said second transverse partition means for signalling that the vehicle is going to turn in a second direction; a light means mounted on said longitudinal partition means intermediate said first and second partition means; inertia switch means mounted on said longitudinal partition means intermediate said first and second transverse partition means; and circuit means for interconnecting said light means and said inertia switch means, said inertia switch means being actuated by a predetermined rate of deceleration of the vehicle to energize said light means to signal that the vehicle is rapidly decelerating.

8. A signal unit as set forth in claim 7 wherein: said lens means includes a first lens of a first color extending intermediate said first end wall and said first transverse partition means and associated with said first source of light, a second lens of said first color extending intermediate said second end wall and said second transverse partition means and associated with said second source of light, and a third lens of a second color extending intermediate said first and second lenses and associated with said light means.

9. A signal unit as set forth in claim 7 wherein: said longitudinal partition means is mounted intermediate first and second side walls in longitudinally extending slot means, said first slot means being integrally formed with said first side wall and said second slot means being integrally formed with said second side wall; and said lens means is mounted intermediate said first and second side walls in third and fourth slot means, said third slot means being integrally formed with said first side wall and extending substantially parallel to and spaced-apart from said first slot means, and said fourth slot means being integrally formed with said second side wall and extending substantially parallel to and spaced-apart from said second slot means.

10. A signal unit as set forth in claim 7 wherein: said inertia switch means includes a base plate mounted in juxtaposition with said longitudinal partition means, frame means connected to and extending outwardly from said base plate, pendulum means connected to said frame means for pivotal movement relative to said base plate, fixed contact means supported by said base plate, movable contact means supported by said pendulum means, said pendulum means being pivoted toward said base plate by a predetermined rate of deceleration of the vehicle to bring said movable contact means into engagement with said fixed contact means to energize said light means.

11. A signal unit as set forth in claim 7 wherein: said light means includes a brake light means for signalling the application of a brake means for the vehicle to decelerate the vehicle and a deceleration light means for signalling deceleration of the vehicle in excess of a predetermined rate of deceleration when the brake means for the vehicle is applied.

References Cited

UNITED STATES PATENTS

| | | | |
|---|---|---|---|
| 2,751,575 | 6/1956 | Jacobs et al. | 340—262 XR |
| 3,278,766 | 10/1966 | Ticknor | 200—61.45 XR |

ALVIN H. WARING, Primary Examiner

U.S. Cl. X.R

340—262; 200—61.45